United States Patent
Filz

[11] 3,804,000
[45] Apr. 16, 1974

[54] INJECTION BLANCHING APPARATUS
[75] Inventor: William F. Filz, Portland, Oreg.
[73] Assignee: North Pacific Canners & Packers, Inc., Portland, Oreg.
[22] Filed: July 13, 1972
[21] Appl. No.: 271,243

Related U.S. Application Data
[62] Division of Ser. No. 83,767, Oct. 26, 1970, Pat. No. 3,707,384.

[52] U.S. Cl. .................................................. 99/533
[51] Int. Cl. ............................................. A23l 3/34
[58] Field of Search .............. 99/532, 533, 516, 646

[56] References Cited
UNITED STATES PATENTS
2,821,901  2/1958  Abrams................................ 99/532
3,249,137  5/1966  Conrad ................................ 99/582
3,377,989  4/1968  Sandhage............................. 99/533

Primary Examiner—Robert W. Jenkins
Attorney, Agent, or Firm—Klarquist, Sparkman, Campbell, Leigh, Hall & Whinston

[57] ABSTRACT

The method of uniformly blanching an ear of corn by blanching the kernels by an exterior operation and independently blanching the pith. A corn ear blanching apparatus having means for blanching the kernels by an exterior operation, and an arrangement for inserting a hollow perforated needle into the pith to inject hot fluid into the pith to independently stop the enzymic activity thereof.

6 Claims, 6 Drawing Figures

INJECTION BLANCHING APPARATUS

The present application is a division of my copending application entitled "Injection Blanching Method and Apparatus", Ser. No. 83,767, filed Oct. 26, 1970, now U.S. Pat. No. 3,707,384.

The present invention relates to a method and apparatus for uniformly blanching ears of corn.

At present it is the standard practice to blanch ears of corn by subjecting them to a hot fluid at a sufficient temperature to blanch the kernels. However, if the temperature is high enough as to materially affect the enzymic activity of the pith or core of the ear, it overblanches or cooks the kernels, giving them a undesired texture and impairs the flavor, resulting in a starchy taste. On the other hand, if the temperature is maintained at a level sufficient to avoid overblanching, heat transferred to the core is insufficient to materially affect its enzymic activity. Thus, the enzymic activity in the core or pith continues after the blanching step and frequently gives a peculiar and undesirable taste to the kernels. Spreading of this undesirable taste seems to be accelerated when the blanched ears are subsequently cooked by the housewife.

An object of the present invention is to provide a method overcoming the above difficulties and particularly to provide a method of uniformly blanching ears comprising blanching the kernels by an exterior operation and independently blanching the pith or core area by an internal blanching operation.

Another object of the invention is to provide an apparatus for carrying out the above steps.

Another object of the invention is to provide a method and an apparatus for uniformly blanching ears of corn.

Various other objects will be apparent from the following description taken in connection with the accompanying drawings wherein.

Referring now in detail to the drawings there is shown therein an apparatus for blanching corn forming one embodiment of the invention.

Figure 1:
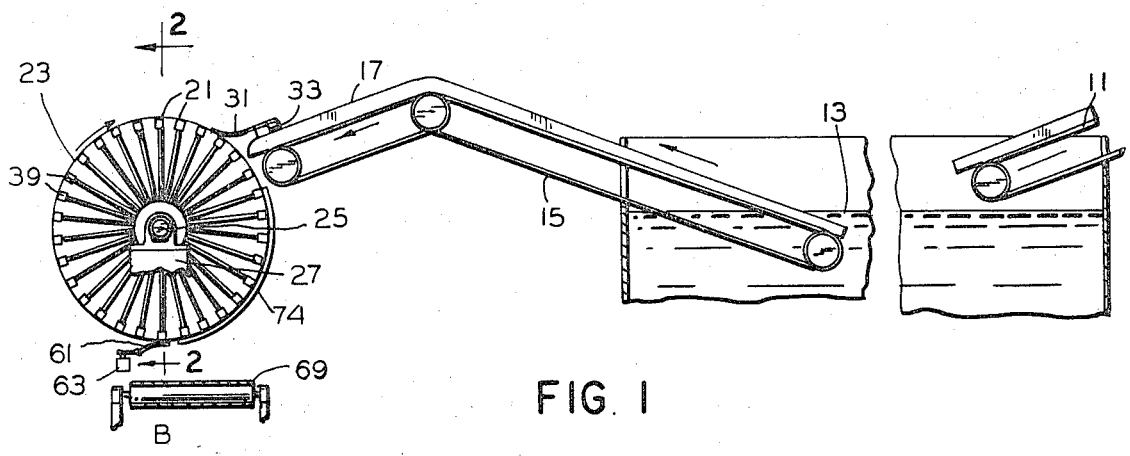
FIG. 1 is a side, partly diagrammatic view of an apparatus for carrying out the method of my invention.

In FIG. 1, the exterior blanching step is shown as being carried out by apparatus disclosed in diagrammatic form. The ears to be blanched are usually trimmed at both ends before being blanched. These ears are fed by an infeed conveyor 11 into a bath 13 of hot water at a blanching temperature in which the kernels are sufficiently blanched to stop their enzyme activity, but not carried sufficiently far as to adversely affect the texture, condition or flavor of the kernels. Instead of a water bath, the ears may be conveyed through a steam chamber to accomplish the same result.

A conveyor 15 removes the ears from the bath 13 and delivers them in single file fashion to a chute 17. Chute 17 delivers the ears of corn with their axes at right angles to the length of the conveyor to deposit the ears in single file fashion in successive pockets 21 of drum 23. The drum is mounted on a hollow spindle 25, which is supported by bearings 27 for rotary movement.

There is a hollow or tubular, laterally perforated needle 29 (FIG. 2) associated with each of the pockets 21, each pocket having a needle guide hole or tube 31 formed in the drum through which the needle passes.

Figure 4:
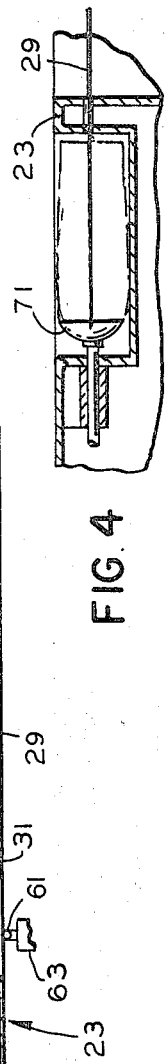
FIG. 4 is an enlarged, vertical sectional view of an apparatus forming an alternate embodiment of the invention.

Each needle has plural holes spaced along the portion thereof in the ear. The arrangement is such that as each ear is deposited in its pocket 21, a sensing lever or feeler 31 (FIG. 1) is shoved to actuate a control 33, which can be in the form of a microswitch, to actuate an air valve 35 (FIG. 2) in a line 37 to allow compressed air to be delivered to the cylinder 39, which has a piston 41 carrying the needle 29. This action forces the needle to the left so that it passes through the guide hole 31 and into the core or pith area 45 of the cob 46 of the ear of corn, as shown in FIG. 4, whereupon hot water is injected into the pith area 45 of the ear 47 through the needle 29. The water is delivered to the needle through a flexible hose 51 leading to a hot water chamber 53, which is a composite part of the spindle 25.

The water pressure is sufficient to force the water through the pith and root zone of the kernels and outwardly between the kernels.

Figure 2:
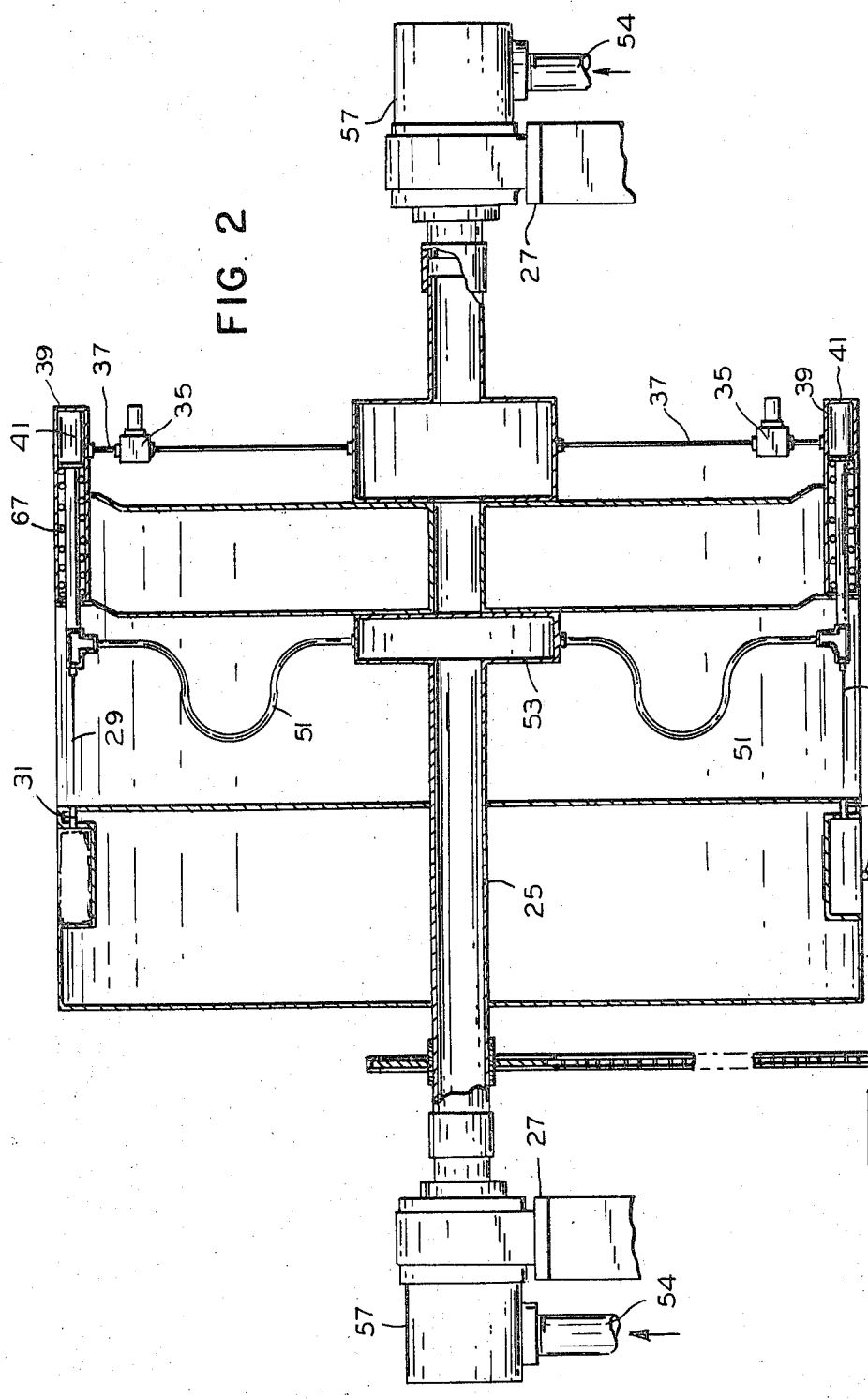
FIG. 2 is a vertical sectional view taken along line 2—2 of FIG. 1.

The hot water is delivered to the left hand portion of the spindle, as viewed in FIG. 2, through a rotary union or coupling 57 which is connected to a source of hot water under pressure (not shown) by a stationary pipe 54.

The needle 29 acts to retain the ear of corn in the pocket 21 as the drum 23 is slowly rotated so that the pithy core of the ear of corn is subjected to the hot water issuing from the perforations in the needle, so that by the time the ear reaches position B, as shown in FIG. 1, the enzymic activity of the pith area has been halted. There is a sensing lever or feeler 61, which is actuated upon engagement with an ear, to actuate a control 63 to reverse the valve 35, whereupon a compression spring 67 (FIG. 2) around the piston 41 retracts the needle, whereupon the processed ear is dropped from the pocket onto a conveyor 69 (FIG. 1). A double acting cylinder could be used if desired.

While the apparatus shown blanches the kernels first, and then the pith, the reverse operation is also satisfactory.

The operating conditions in one installation were as follows: the water was injected into the core of an ear with a pressure of between 80 – 90 pounds per square inch and at a temperature just below boiling, around 205°– 210° F. The water injection continued for a few seconds, usually 4 – 5 conds. Then the ears were moved through a hot water bath at a temperature of around 205°– 209° F. for about 3 – 4 minutes to blanch the kernels. Next the ears were passed through a cooling water spray. Afterward they were immersed in a cold water tank to halt the action of the heat.

To above conditions can be varied somewhat depending on the condition and maturity of the ears, but if carried out properly, the kernels are firm and resilient to the touch, not soft and flabby, and the taste is sweeter than otherwise would be the case. One variation of the above procedure would be to shorten the kernel blanching time somewhat when the blanching is carried out with steam.

Embodiment of FIG. 4

A blanching apparatus forming an alternate embodiment of the invention and shown in FIG. 4 includes a suction cup 71 in each pocket to engage an end of an ear of corn and apply suction to the same just after the hot water supply is stopped. This lowers the pressure around the ear and causes the hot water in the ear to flash off to not only get rid of the hot water but also to substantially cool the ear and stop any further blanching or cooking of the same.

Retaining guide rods or shield, like a shield 74 (FIG. 1), hold the ears in the pockets until the six o'clock discharge position is reached. The suction is cut off from each cup 71 at about the five thirty or six o'clock position, and the needles are withdrawn at the six o'clock position.

Figure 5A:
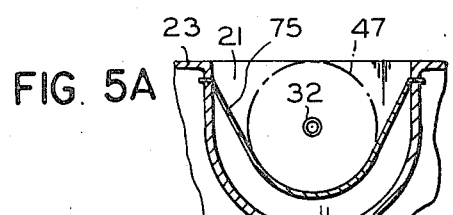
FIG. 5A is a fragmentary cross sectional view showing a support for the smaller end of an ear of corn.
Figure 5:
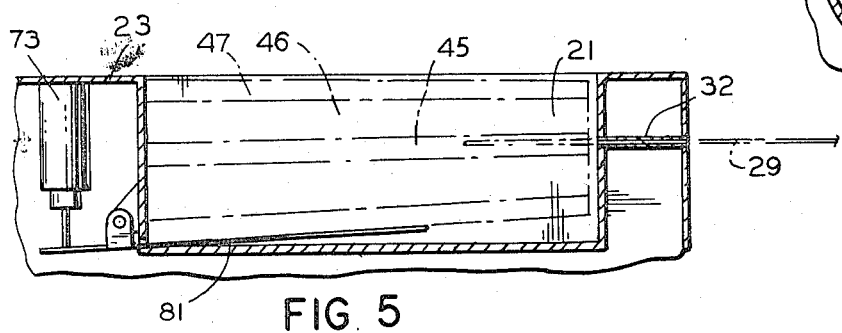
FIG. 5 is an enlarged, vertical sectional view of an apparatus forming an alternate embodiment of the invention.

Embodiment of FIG. 5

Figure 3:
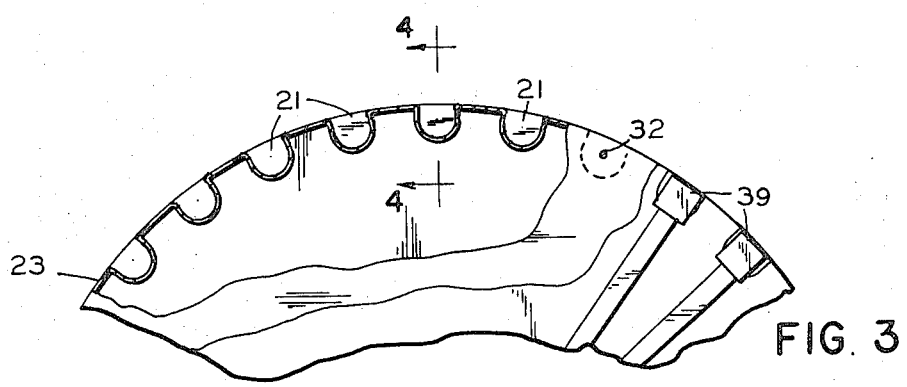
FIG. 3 is an enlarged, fragmentary, partially sectional side elevation view of the apparatus of FIG. 1.

A blanching apparatus forming an alternate embodiment of the invention is like that of FIGS. 1 to 3 and is identical to the apparatus of FIG. 1 except that instead of the feelers 31 and 61, the apparatus of FIG. 5 has a trip lever 81 incorporated in each pocket so that when an ear of corn drops in the pocket, the trip lever will actuate a control 73 to cause actuation of the solenoid valves in the air and hot water lines to open them. However, when the trip lever 81 reaches position B in FIG. 1, it will engage a control arm (not shown) which will effect the retraction of the needle and discharge the ear.

FIG. 5A shows a hanger 75 having ends fitting through slots in the wall of the pocket 21 to releasably retain it in place. Such a device or equivalent device can be used to support the smaller end of the ear of corn in general alignment with the needle 29. Instead of the hanger 75, the floor of the pocket could be inclined so as to tend to support the ear of corn with its axis parallel to the axis of the drum 23 and in alignment with the needle 29.

What is claimed is:

1. In an apparatus for blanching ears of corn,
a rotary turret having plural ear receiving pockets thereabout,
a hollow, laterally perforated injection needle aligned with each pocket,
means forcing each needle into the core portion of an ear of corn in the associated pocket,
water pressure supply means for supplying a blanching fluid under pressure to the interior of the needles to cause radial passage of the fluid through the core portions and out between the kernels,
and flexible conduit means on said turret connecting said water pressure supply means to said needles to facilitate movement of said needles into and out of said ears.

2. An apparatus as described in claim 1 in which the water pressure supply means includes a rotary coupling on the axis of rotation of said turret for supplying blanching fluid to the needles, control means for cutting off the supply of fluid to said needles during part of the rotary movement of said turret.

3. In an apparatus for blanching an ear of corn,
a hollow, laterally perforated injection needle,
means for aligning an ear coaxially with said needle, means forcing the needle into the core portion of an ear of corn,
water pressure supply means for supplying a blanching fluid under pressure to the interior of the needle to cause radial passage of the fluid through the core portion and out between the kernels,
and flexible conduit means connecting said water pressure supply means to said needle to facilitate movement of said needle into and out of said ear, said apparatus including holding means for holding the ear of corn while the needle is forced into the ear,
and means for moving the holding means and the needle as a unit to convey the ear of corn,
means for drawing off the fluid from the interior of the ear of corn,
the last-named means including suction means for lowering the pressure within the ear.

4. In an apparatus for blanching an ear of corn,
a hollow, laterally perforated injection needle,
means for aligning an ear coaxially with said needle, means forcing the needle into the core portion of an ear of corn,
water pressure supply means for supplying a blanching fluid under pressure to the interior of the needle to cause radial passage of the fluid through the core portion and out between the kernels,
and flexible conduit means connecting said water pressure supply means to said needle to facilitate movement of said needle into and out of said ear, said apparatus including exterior blanching means, separate from said needle and supply means, for blanching the exterior portion of the ear of corn, said exterior blanching means including liquid immersion means.

5. In an apparatus for blanching ears of corn,
a hollow, laterally perforated injection needle,
means for axially moving said needle back and forth along a predetermined path,
means providing, for an ear of corn, a pocket aligned with said path,
means for supplying ears of corn successively to said pocket to facilitate injection of said needle into each ear while it is in said pocket,
means for injecting hot fluid into said needle while it is impaled in an ear,
and means for effecting discharge of each ear from said pocket after it has been injected and prior to the deposit in said pocket of the succeeding ear.

6. An apparatus described in claim 5 in which said apparatus includes a rotary turret containing other ear-receiving pockets, and a needle mounted and moved similar to the first needle for each of the other pockets, and adapted to receive hot fluid when it is impaled in an ear.

* * * * *